Dec. 8, 1970   C. J. SNYDER ET AL   3,546,029
DESCALING COPPER RODS
Filed July 31, 1968
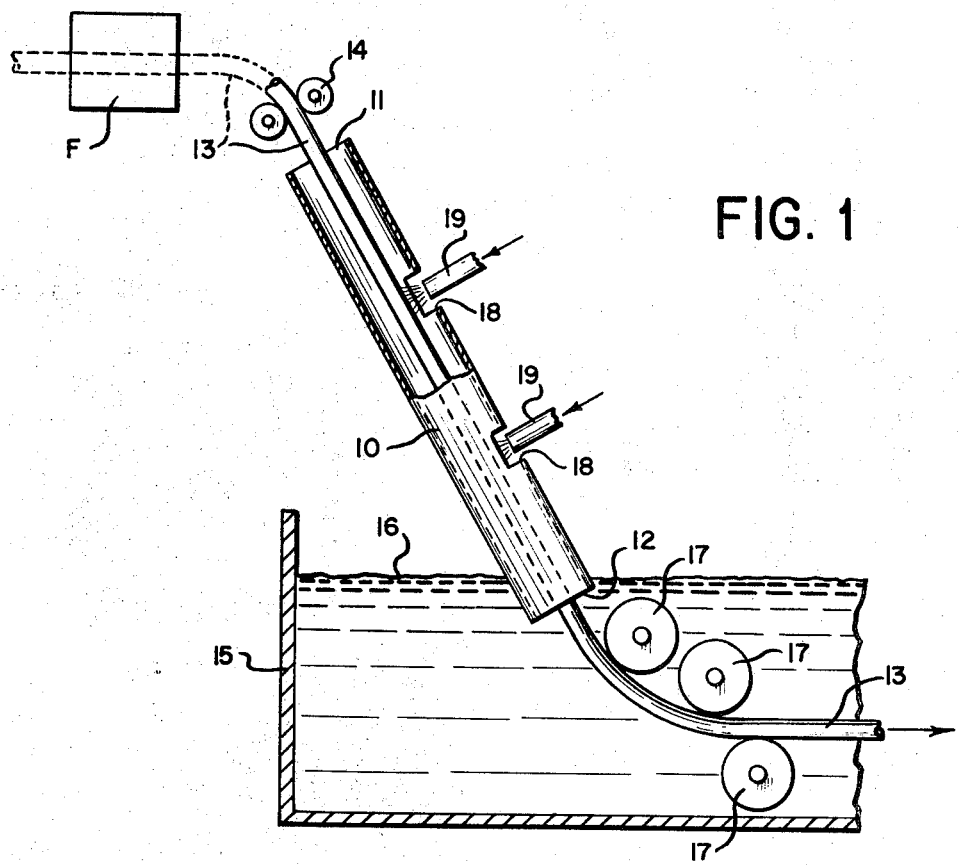
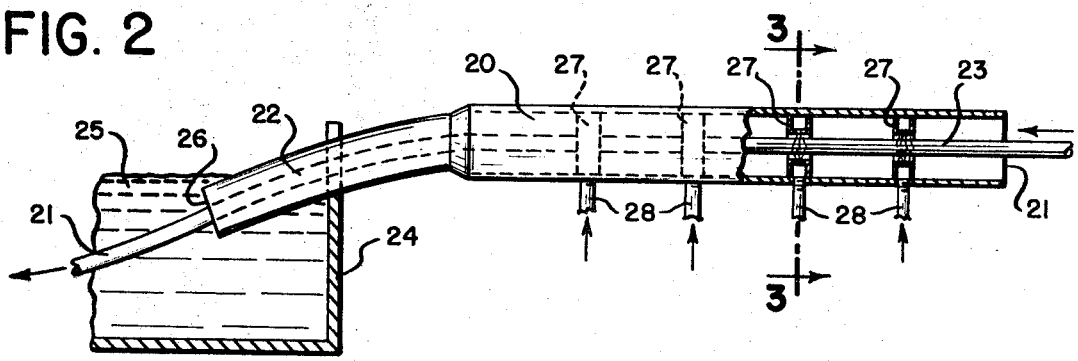
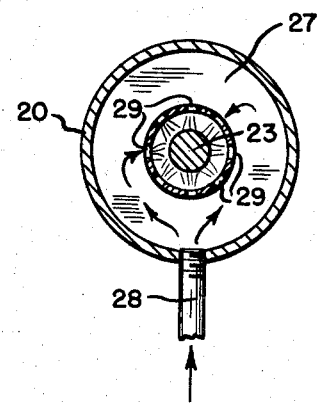
INVENTORS.
CLERMONT J. SNYDER
BY JACK P. MOORE
ATTORNEYS

United States Patent Office 3,546,029
Patented Dec. 8, 1970

3,546,029
DESCALING COPPER RODS
Clermont J. Snyder and Jack P. Moore, Hastings-on-Hudson, N.Y., assignors to Anaconda Wire and Cable Company
Filed July 31, 1968, Ser. No. 749,013
Int. Cl. C21d 1/74
U.S. Cl. 148—13.2             8 Claims

ABSTRACT OF THE DISCLOSURE

Scale is removed from a copper rod by continuously introducing the copper rod at a temperature below 1000° F. into a descaling zone wherein the rod is exposed to a reducing atmosphere and is heated in such atmosphere to a temperature above 1100° F. (preferably between 1200° F. and 1400° F.) to effect substantially complete reduction to metallic copper of the oxide scale. Immediately thereafter the rod is quenched in a liquid (preferably aqueous) coolant to a temperature below that at which any substantial reoxidation can occur before exposing the rod to an oxidizing environment. Apparatus for carrying out such descaling operation comprises a tubular descaling chamber through which the rod is passed, burners positioned to direct a reducing flame into the interior of the chamber, and a coolant vessel containing a liquid coolant in which the rod exit end of the descaling chamber is immersed.

---

This invention relates to the descaling of a copper rod to eliminate oxide scale therefrom.

Copper rods from which copper wire is drawn are formed by hot-rolling cast copper wire bars. The hot-rolled copper rod is usually circular in cross-section and commonly about $5/16$ inch in diameter. The hot-rolling operation is normally carried out in the open air, and in consequence the rod is covered with an oxide scale, some of which is only loosely adherent to the underlying metal. This scale must be removed before the rod is cold-drawn into wire.

A procedure long used for removing scale from copper rod involves immersing the rod in a dilute sulfuric acid solution (a procedure commonly known as pickling). Black cupric oxide scale is readily removed by this procedure, but the underlying and more firmly adherent red cuprous oxide scale may be only imperfectly removed. Another procedure which long has been used to ensure thorough removal of the scale involves drawing the rod (usually after pickling) through a scalping die by which a thin shaving is mechanically taken from the surface of the rod. Other procedures for removing scale from copper rod have also been developed. One process that has enjoyed marked success involves exposing the rod to an atmosphere containing a halide vapor or a halogen at a temperature below 700° F., then heating to a dull red heat (e.g. about 1200° F.), and then cooling to room temperature. This procedure results in formation of a scale which separates readily and leaves the surface of the rods clean, free of dust and slivers, and without objectionable pits.

These commercially-used descaling procedures all involve the consumption of a substantial part of the copper rods in the form of scale loss or scrap. Generally this loss amounts to as much as 1% to 5% of the weight of the rods. Special reclaiming procedures are necessary to recover the metal values of the scale scrap or pickle liquor.

It has long been known that copper oxide may be readily reduced to metallic copper by heating in a reducing atmosphere. However, proposals made heretofore to descale copper by exposure to a hot reducing atmosphere and then cooling to room temperature have not met with practical success. It has commonly been found that the reduced scale forms a heavy and loosely adherent deposit on the surface of the rod, which must be removed before the rod can be successfully cold-drawn to wire.

I have found that if the oxide scale on hot-rolled copper rod is reduced by introducing the rod at a temperature below 1000° F. into a hot reducing atmosphere and therein heating the rod to above 1100° F., and preferably to near 1300° F., the oxides are reduced to metal which not only adheres firmly to the rod, but in effect is sufficiently intimately bonded thereto so that it does not adversely effect the quality of the rod for subsequent wire-drawing.

In accordance with this invention, therefore, copper rod is descaled by introducing the rod continuously at a temperature below 1000° F. into a descaling zone, wherein the rod is exposed to reducing atmosphere and is heated in such atmosphere to a temperature above 1100° F. to effect substantially complete reduction to metallic copper of the oxide scale thereon. Thereafter, the rod is immediately quenched in a liquid (preferably aqueous) coolant to a temperature below that at which any substantial deoxidation of the copper can occur; and only after such quenching is the rod permitted to pass into an oxidizing environment such as the open air. Preferably the rod is at a temperature between 800° F. and 1000° F. when introduced into the descaling zone, and is heated to between 1200° F. and 1400° F. in the reducing atmosphere of such zone. Advantageously the rod is maintained in the reducing environment of the descaling zone for one-half to five minutes, to enable it to be heated to the desired temperature at which descaling proceeds very rapidly.

Apparatus for carrying out the method of the invention comprises a tubular chamber having a rod entrance end and a rod exit end through which the rod to be descaled may pass. At least one fuel burner is positioned to direct a reducing flame into the interior of the tubular chamber at a position located a substantial distance from the rod entrance end. A coolant vessel is positioned adjacent the rod exit end of the chamber and is adapted to contain liquid coolant to a normal liquid level. The rod exit end of the chamber extends into a coolant vessel to a position below the normal liquid level of the coolant. Thus, the rod exiting from the chamber passes directly into contact with the liquid coolant in the vessel without being exposed to the air.

In the drawings:
FIG. 1 shows schematically one form of apparatus according to the invention;
FIG. 2 shows another form of apparatus according to the invention;
FIG. 3 is a cross-section taken substantially on line 3—3 of FIG. 2.

The apparatus shown in FIG. 1 comprises a tubular descaling chamber 10 having a rod entrance end 11 and a rod exit end 12. A copper rod 13 (which may first be passed through a preheating furnace F) is descaled by being passed continuously through the chamber 10. The rod may be caused to advance by the action of pinch rolls 14, or by the pull of a capstan (not shown), or by any other suitable means.

A coolant vessel 15 is positioned adjacent the rod exit end of the descaling chamber and is adapted to contain a coolant liquid (water, for example) up to a normal liquid level 16. The rod exit end 12 of the descaling chamber extends into the coolant vessel to a position below the normal liquid level 16 of the coolant. Thus the rod emerging from the chamber 10 passes directly into the liquid coolant without coming into contact with the air. The coolant vessel may with advantage be in the form of a relatively long shallow trough, equipped with guide rolls 17 for directing the rod 13 into a substantial horizontal path for advance through the coolant vessel.

The wall of the tubular descaling chamber 10 is formed with openings 18 through which fuel burners 19 are directed. A combustible mixture of air and natural gas or other fuel is delivered to and burned at the burners 19, and the combustion products are delivered from the burners through the openings 18 into the interior of the descaling chamber 10. The proportion of air to fuel in the combustible mixture burned at the burners is such as to produce a strongly reducing combustion gas atmosphere in the chamber 10. The hot combustion gases flow counter-current to the direction of advance of the rod 13, and exit to the atmosphere at the rod entrance end 11. There they may be collected by a hood (not shown) for discharge through a stack or otherwise to the outdoor atmosphere.

The form of apparatus shown in FIGS. 2 and 3 is generally similar to that of FIG. 1, but differ in construction details. It comprises a descaling chamber 20 having a rod entrance end 21 and, at the other end, a rod delivery tube 22. A copper rod 23 is descaled in the course of its passage in the direction indicated by the arrows through the descaling chamber. Movement of the rod through the chamber may be effected by pinch rolls or captstans (not shown), or by any other suitable means.

A coolant vessel 24 (advantageously in the form of an elongated trough) is positioned adjacent the open end of the rod delivery tube 22. The coolant vessel is adapted to contain water or other coolant to a normal liquid level 25; and the open rod exit end 26 of the tube 22 extends to below such liquid level. Rollers or other guides (not shown) may be provided to direct the advancing rod 21 horizontally through the trough 24 below the normal liquid level of the coolant.

The descaling chamber 20 is provided with a series of internally disposed ring-shaped fuel burners 27, to each of which a combustible mixture of fuel and air is delivered through fuel pipes 28. The inner surface of each ring burner is formed with apertures 29 through which the combustible fuel mixture is directed and where it is ignited and burns. The proportion of air to fuel in the combustible mixture is sufficiently low so only incomplete combustion can occur and so that the atmosphere of combustion gases in the descaling vessel is strongly reducing. The combustion gases flow through the descaling vessel 20 in a direction counter-current to the advance of the rod. Upon emerging from the rod entrance end of the descaling chamber they may be collected under a hood (not shown) or otherwise for discharge to the outdoor atmosphere.

As shown in the drawings, the rod is advanced substantially axially through the chamber 20 and through the central opening of each ring burner 27. These openings may be sufficiently small to serve as guides for the advancing rod; but they must be large enough to permit the counter-current flow of the combustion gases to the rod entrance end of the descaling chamber.

The method of the invention is carried out in either form of the apparatus described above as follows: The rod is advanced continuously from a source (not shown) through the descaling chamber, and therefrom directly into the liquid coolant without intervening exposure to the air. The rod upon entering the descaling chamber is advantageously at an elevated temperature approaching but not exceeding 1000° F., and preferably in the range from 800° F. to 1000° F. The rod may be brought to this temperature or to some elevated lower temperature by preheating in advance of its entrance into the descaling chamber. It may for example be passed through a preheating furnace such as is indicated at F in FIG. 1, or it may be introduced into the descaling chamber directly from a hot-rolling operation and while still at an elevated temperature to which it was heated for such operation (but below 1000° F.) Alternatively, the rod may be advanced cold into the descaling chamber and may there be heated to the desired descaling temperature by the hot combustion gases fed into the chamber from the fuel burners.

In the descaling chamber and while in the reducing atmosphere therein the rod is heated to the descaling temperature of above 1100° F. by the hot reducing gases. Preferably the rod is here heated to a temperature from 1200° F., to 1400° F., most advantageously near 1300° F., for rapid descaling to proceed. The rod remains in the reducing atmosphere in the descaling chamber for a sufficient period of time to be heated to the desired temperature; and when so heated substantially complete reduction of the copper oxide scale thereon to metallic copper takes place very rapidly. A time of from one-half to five minutes in the descaling chamber is generally sufficient to heat the rod to descaling temperature. The desired exposure time can be provided readily by co-relating speed of advance of the rod through the descaling chamber with the length of such chamber in which the rod is exposed to the hot reducing gases and with the temperature of the rod upon introduction into such chamber. As an example, with a reduction chamber approximately five feet in length, cold copper rod may be heated to a temperature near 1300° F. in the reducing atmosphere of apparatus of the sort shown in FIG. 2 by being advanced through such apparatus at a linear velocity of about one foot per minute. If the rod is preheated say to 500° F. or above prior to entrance into such descaling chamber, the rate of advance through the apparatus may be substantially higher.

The rod must not be introduced into the descaling chamber at a temperature above 1000° F., for then the reduced scale will be sufficiently non-adherent to be disadvantageous in subsequent drawing operations. Even when introduced at temperatures near 1100° F., a deposit of non-adherent reduced scale forms upon exposure to the reducing atmosphere. But after entrance into the reducing atmosphere of the descaling chamber, heating of the rod to the desired temperature approaching 1300° F. (a dull red heat) may proceed as rapidly as the heating capacity of the descaling chamber permits. Temperature control and rate of heating in the descaling chamber may be achieved by controlling the composition of the air fuel mixture burned at the burners and the rate at which fuel is burned. It may also be controlled within limits by co-relating the speed of advance of the rod through the descaling chamber with the length of such chamber and the temperature of the rod entering the chamber.

The descaled rod emerging from the descaling chamber into the liquid coolant is free of oxide scale and has a metallic copper surface layer which is firmly adherent to the underlying metal and well suited for cold drawing in normal wire drawing operations.

It is a significant advantage of the method of this invention that but little copper is lost as a result of the descaling operation. Typically, copper rod descaled as herein described will suffer a scale loss in the range from 0.03% to 0.05% by weight of the rod, as compared with losses from twenty to fifty times as great when descaling is accomplished by methods heretofore known.

Following is an example of a descaling operation according to the method of the invention, which was carried out in apparatus substantially of the character shown in FIG. 1.

A ⁵⁄₁₆" diameter copper rod with oxide scale thereon was preheated to 900° F. The hot rod was passed at a rate of 3 inches per minute through a descaling chamber in the form of a tube 1.5 inches in diameter and 12 inches long, with 2 cut-outs in its wall for two gas burners. The burners, mounted exteriorly of the tube, were positioned to direct reducing flames through the cut-outs against the copper rod. The reducing flame was produced by burning at the burner a combustible mixture of natural gas with insufficient air for its complete combustion. The temperature of the rod during its passage through the descaling chamber was increased by the hot combustion gases to a dull red heat (approximately 1300° F.). The rod upon emerging from the descaling chamber was immediately immersed in water and remained therein until cooled to room temperature. The rod was then removed from the water and examined. The copper oxide scale was gone, and the metallic copper at the rod surface was firmly adherent to the underlying metal. The rod was of excellent quality for cold drawing the wire.

We claim:

1. The method of descaling a copper rod which comprises introducing said rod continuously at a temperature below 1000° F. into a descaling zone, exposing said rod in said zone directly to a reducing atmosphere and heating said rod while in the reducing atmosphere to a temperature above 1100 F. to effect substantially complete reduction to metallic copper of the oxide scale thereon, and thereafter immediately quenching said rod in a liquid coolant to a temperature below that at which any substantial reoxidation of the copper can occur before allowing said rod to pass into an oxidizing environment.

2. The method according to claim 1 wherein the descaling zone is a slender elongated region immediately surrounding the rod in which a fuel gas is continuously burned with insufficient air for complete combustion and through which the products of combustion pass in countercurrent to the direction of passage of the rod.

3. The method according to claim 1 wherein the rate of passage of the rod through the descaling zone is such that the rod is exposed to deoxidation therein for ½ to 5 minutes.

4. The method according to claim 1 wherein the temperature of the rod upon introduction into the descaling zone is between 800° F. and 1000° F.

5. The method according to claim 1 wherein the rod is heated to a temperature between 1200° F. and 1400° F. during its passage through the descaling zone.

6. The method according to claim 1 wherein the rod is preheated to at least about 500° F. prior to its introduction into the descaling zone, and is heated to a temperature near 1300° F. during its passage through such zone.

7. The method according to claim 1 wherein the copper rod is hot-rolled to size at red heat and is introduced into the descaling zone directly from such rolling operation while still at an elevated temperature.

8. The method according to claim 6 wherein the copper rod is preheated to above 800° C. and is introduced at such temperature into the descaling zone.

References Cited

UNITED STATES PATENTS 2,643,961   6/1953   Snyder et al. _____ 148—13.2

RICHARD O. DEAN, Primary Examiner

U.S. Cl. X.R.

148—20.3